US007063778B2

(12) United States Patent
Mpholo et al.

(10) Patent No.: US 7,063,778 B2
(45) Date of Patent: Jun. 20, 2006

(54) MICROFLUIDIC MOVEMENT

(75) Inventors: Moeketsi Mpholo, Cambridge (GB); Benjamin Brown, Cambridge (GB); Charles Gordon Smith, Cambridge (GB)

(73) Assignee: Cambridge University Technical Services, Ltd. (GB)

( * ) Notice: Subject to any disclaimer, the term of this patent is extended or adjusted under 35 U.S.C. 154(b) by 17 days.

(21) Appl. No.: 10/501,440

(22) PCT Filed: Jan. 14, 2003

(86) PCT No.: PCT/GB03/00082

§ 371 (c)(1),
(2), (4) Date: Jul. 13, 2004

(87) PCT Pub. No.: WO03/057368

PCT Pub. Date: Jul. 17, 2003

(65) Prior Publication Data

US 2005/0040035 A1 Feb. 24, 2005

(30) Foreign Application Priority Data

Jan. 14, 2002 (GB) ................................ 0200705.2

(51) Int. Cl.
*G01N 27/447* (2006.01)

(52) U.S. Cl. ....................................... 204/547; 204/643

(58) Field of Classification Search ................ 204/547, 204/643

See application file for complete search history.

(56) References Cited

U.S. PATENT DOCUMENTS 4,390,403 A * 6/1983 Batchelder .................. 204/547
5,632,876 A 5/1997 Zanzucchi et al.
6,113,768 A * 9/2000 Fuhr et al. .................. 204/643

FOREIGN PATENT DOCUMENTS

EP 0957576 A2 * 11/1999
WO WO 9734689 A1 * 9/1997

OTHER PUBLICATIONS

Studer et al. (Fabrication of micro fluidic devices for AC electrokinetic fluid pumping, Microelectronic Engineering 61-62 (2002) 915-920).*
Schnelle et al. (Adhesion Inhibitated Surfaces. Coated and Uncoated Interdigitated Electrode Arrays in the Micrometer and Submicrometer Range, Langmuir 1996, 12, 801-809).*

* cited by examiner

*Primary Examiner*—Alex Noguerola
(74) *Attorney, Agent, or Firm*—McDonnell Boehnen Hulbert & Berghoff LLP

(57) ABSTRACT

An apparatus for driving small volumes of fluid. The apparatus comprises a substrate and a first array of electrically conductive electrodes formed on the substrate. A second array of electrically conductive electrodes formed on the substrate, the first and second array being interlaced and being arranged such that each of the electrodes in the second array has a width in a fluid driving direction which is greater than that of each of the electrodes in the first array and such that the first and second set electrodes are positioned so that each of the electrodes of the first set is not at a position equidistant from adjacent electrodes of the second set, wherein both of the arrays of the arrays of electrode having widths in the fluid flow direction and thickness selected such that, in use, by varying the peak value of an alternating drive voltage applied thereto the direction of flow of a fluid adjacent to the arrays of electrodes can be controlled.

13 Claims, 9 Drawing Sheets

Fig.3[1]
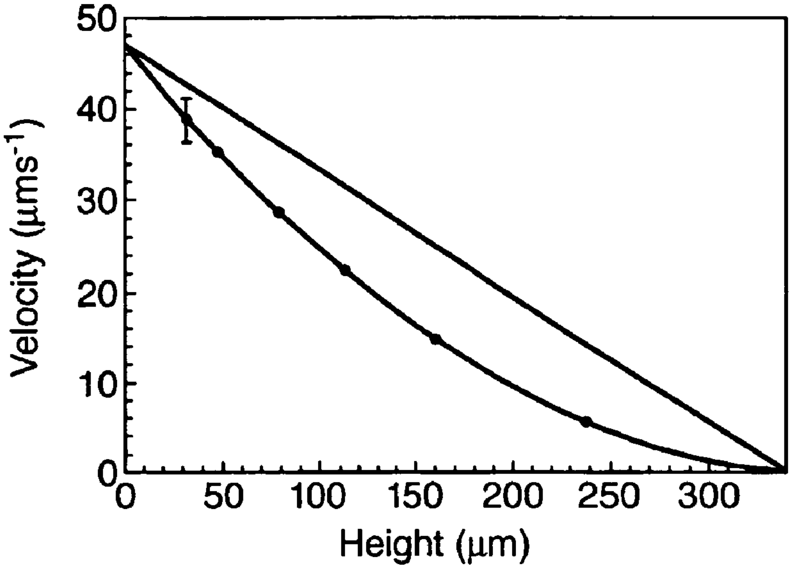
Fig.4[1]
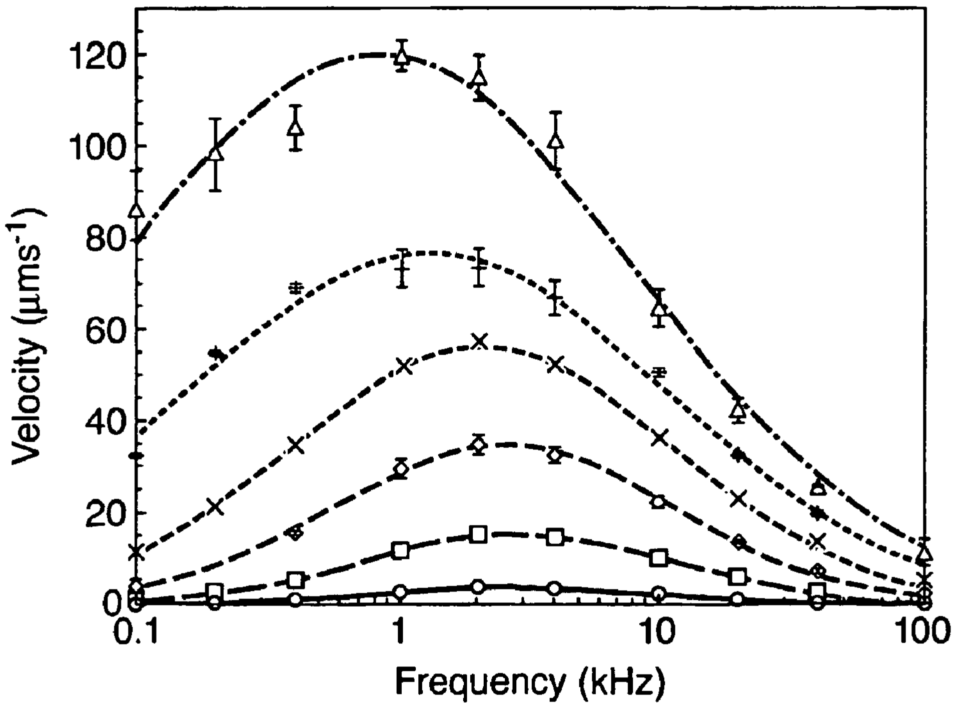

MICROFLUIDIC MOVEMENT

The present invention relates to the movement of very small volumes of fluids. In recent years there has been an increase in interest in the control of the movement of small volumes of fluid. This is because the movement of such small volumes is important in the field of biotechnology, as single cells and the fluid surrounding them need to be manipulated. Furthermore, micro machines are being developed for use in a wide number of fields, such as analytical probes, drug delivery systems and surgical tools. To perform these tasks it is necessary to pump fluids to provide a propulsion mechanism or in order to move materials held in the fluids.

A number of methods of moving small volumes of fluid have been proposed in the past. These include employment of thermal gradients, or electric or magnetic fields, as well as the employment of piezoelectric actuators.

Such systems are often complex to manufacture, however, and can be unreliable in terms of the level of control that they provide. Furthermore, most, if not all, are capable of directing fluids only in a single direction, which means that if they are to be employed for movement of fluid in different directions it is often necessary to duplicate components, which increases their overall complexity and cost and also reduces the reliability of the devices.

The present invention seeks to provide a device for moving small volumes of fluid which overcomes some of the above problems.

According to the present invention there is provided an apparatus for driving small volumes of fluid, the apparatus comprising:

a substrate;

a first array of electrically conductive electrodes formed on the substrate; and a second array of electrically conductive electrodes formed on the substrate, the first and second array being interlaced and being arranged such that each of the electrodes in the second array has a width in a fluid driving direction which is greater than that of each of the electrodes in the first array and such that the first and second set electrodes are positioned so that each of the electrodes of the first set is not at a position equidistant from adjacent electrodes of the second set, wherein both of electrodes have widths in the fluid flow direction and thickness selected such that, in use, by varying the peak nature of an alternating drive voltage applied thereto the direction of flow of a fluid adjacent to the arrays of electrodes can be controlled.

The present invention also provides means for providing a variable alternating voltage to the first and is second array of electrodes.

An insulator may be provided over at least a portion of one or both of the electrode arrays.

The fluid driving apparatus of the present invention may be arranged to drive fluid passing thereover in two opposite directions in order to provide a mixing effect.

The apparatus of the present invention may have a third set of electrodes having a width substantially identical to that of the first set, interlaced with the second set of electrode and separated from the first set by an insulator.

The present invention also provides a device for moving fluid by plug flow comprising two apparatus of the type defined above facing one another and defining a cavity therebetween.

The present invention may also provide a device for drawing fluids from two sources, mixing them and pumping them, the device comprising a first apparatus of the type described above; a second apparatus of the type defined above but having its electrodes arranged to be a mirror image of those of the first device; and a third apparatus of the type defined above positioned at the meeting point of the first and second apparatus.

The apparatus of the present invention may be configured to move elements, such as semiconductor components, within a fluid passing thereover.

The apparatus of the present invention may be employed to drive a micromachine.

The apparatus of the present invention may be arranged to be employed in a biochemical analysis process or drug manufacture process, or identify pathogens, bacteria or viruses.

A corresponding method is also provided.

Examples of the present invention will now be described with reference to the accompanying drawings, in which:

FIG. 3 is a graph showing theoretical and actual fluid velocity versus height above the device of FIGS. 1A and 1B;

FIG. 4 is a graph showing velocity variation versus drive frequency for the device of FIGS. 1A and 1B;

Figure 1A:
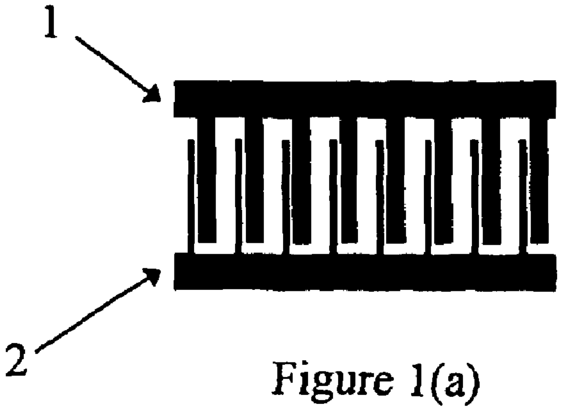
FIGS. 1A and 1B are plan and side views respectively of a device according to the present invention.

Referring to FIG. 1A, a planar array 1 of conductive electrodes 4, 6 comprises a first set of larger electrodes 6 which are placed adjacent to an array of smaller electrodes 4 such that one edge of each of the larger electrodes 6 opposes one edge of each of the smaller electrodes 4. The electrodes 4, 6 are formed on a substrate 3 that is formed from a non-conducting material such as glass, quartz or silicon. The electrodes 4, 6 are formed so that they have a thickness, in this example, of approximately 100 nm and are spaced apart from one another by a distance of approximately 2 μm for the smaller spacing. The electrodes 4, 6 are usually formed from metal and can be formed by techniques such as lithography, micromachining, printing, rubber stamping or laser machining. An adhesive layer 9 may be provided to ensure good bonding of the electrodes 4, 6 to the substrate 3.

In use, a low voltage electric potential (usually less than 5 volts) is applied to the electrodes. The voltage is alternated at a frequency and so that the potential is low enough that ions in a fluid 7 above the surface of the electrodes 4, 6 can equilibrate locally. This usually means alternating the voltage in the kHz region for a monovalent salt solution. Upon application of the voltage potential the electrodes 4, 6 charge in a non-uniform manner to produce a gradient in potential parallel to the surface of the electrodes. This gradient drives the ions in the fluid 7 across the surface of the electrodes 4, 6 and the ions act through friction with the fluid to drag fluid molecules which produces a net fluid flow. The net fluid flow is caused by the anisotropic nature of related pairs of electrodes 4, 6. FIG. 2 shows an example of the present invention in which fluid flow 11 is generated in the fluid. FIG. 3 shows how an example configuration of the example of FIGS. 1A and 1B has a variation in generated fluid flow velocity with height 10 (FIG. 2) above the electrodes 4, 6. As can be seen from this graph, flow rate does not vary linearly with height due to pressure distribution generated within the device by flow of fluid therethrough. The straight line shows how flow would vary if there were no-back pressure. However, assuming laminar fluid flow, the shape of the curve should remain the same for increased relative velocities of fluid flow.

FIG. 4 shows how varying the frequency of the applied voltage to the electrodes 4, 6 can change the velocity of the fluid 7 for a series of differing values of applied voltage from 0.2 Vrms to 1.2 Vrms. The peak increases in size and moves to lower values for frequency as the amplitude of the applied signal is increased. This is because the potential across adjacent electrodes 4, 6 is greater at lower frequencies and more compressed at higher potential and lower frequencies.

Figure 5:
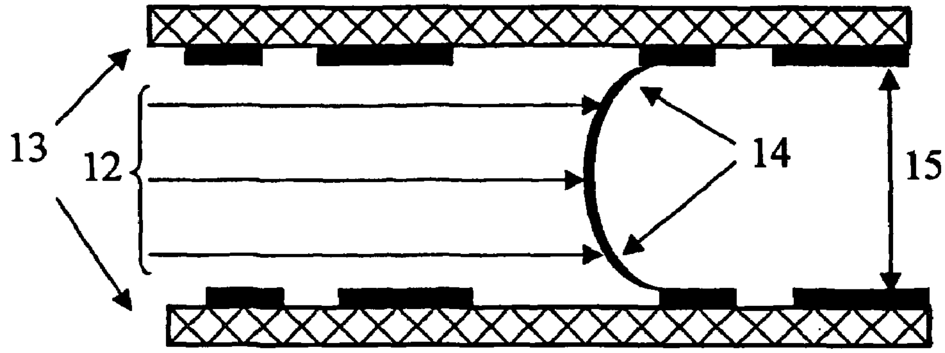
FIG. 5 is a side view of a second example of the present invention.

FIG. 5 shows an example of the present invention, in which a further set of electrodes 4, 6 is positioned on a second substrate 3 above the first set of electrodes 4, 6. The two sets of electrodes 4, 6 are separated by a distance 15 which is sufficiently small to generate a plug flow profile for liquid 12. The distance 15 can be very small (in the region of 100 μm or less) down to the period of the electrode pairs and, because of the driving nature of the forces generated by the electrodes 4, 6, the viscosity of the fluid 12 is not a concern. This is because the force is generated from the sides of the passageway that is formed, drawing the liquid 12 forward from the edges of the device, rather than from the centre as would be the case in a traditional pumping method. Reference 14 shows the velocity profile of the liquid 12. It should be noted that the configuration of FIG. 5 has other benefits in terms of employment in particular areas, such as employment in conjunction with DNA strands. For example, with proper alignment of the top and bottom sets of electrodes 4, 6, it is possible to generate high electric fields which stretch DNA strands in the fluid in order to manipulate the DNA strands in a desirable manner.

What has been determined is that, by appropriate selection of the relative dimensions of the electrodes 4, 6 and the spacing therebetween, together with judicious selection of the magnitude of the voltage potential applied and the frequency thereof, the direction of flow of the fluid 7 can change dependent upon the frequency and amplitude of that applied voltage potential. Some discussion of the theory associated with this is set out below with reference to FIG. 9.

However, it is believed that the generation of a reversible flow can be explained by considering the electrical circuit equivalent of the electrodes dissolution to be a capacitor equivalent to the large electrode, a resistor and a second capacitor (equivalent to that of the adjacent smaller electrode) in series. With a double layer over each electrode, if an AC potential is applied to this then there is a potential voltage across the double layer over the small electrode that is always larger than that over the large electrode by an amount equal to the ratio of widths of the two electrodes. This is because the area of the small electrode is k times smaller (assuming equal length of electrodes) providing a capacitance that is k times smaller. As the amplitude of the AC potential is increased the voltage across the double layers above each electrode also increases. Eventually an amplitude is reached where the potential across the double layer on the small electrode is equal to the ionisation potential of the fluid above the electrode. At this point the capacitance of the double layer starts to break down and charge flows across it. In other words, charge is injected into the fluid over the small electrode. This charge will be opposite to the charge on the ions in the double layer already, and so the charges will neutralise these ions. If the fluid is water, for example, this will create oxygen and hydrogen, but in sufficiently low concentrations that they simply dissolve and diffuse away. At the larger electrode the potential drop across the double layer is not large enough to ionise the water and so ions are stored in the double layer. When the applied potential is reversed on the other half of the applied AC signal, the charges above the large electrode will move along the field lines towards the small electrode. The charges over the small electrode will move towards the large electrode. However, far fewer ions are on the small electrode given the neutralisation process, and thus the bulk flow of ions is from the large electrode to the small electrode. The flow of ions drags the fluid with it and causes movement, which is the observed pumping.

Figure 1B:
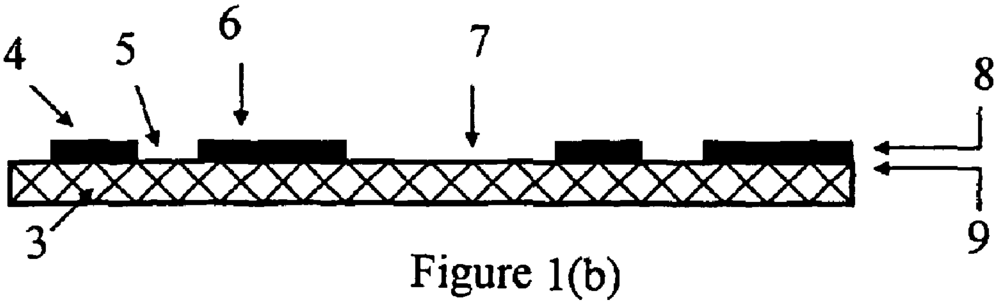
Figure 2:
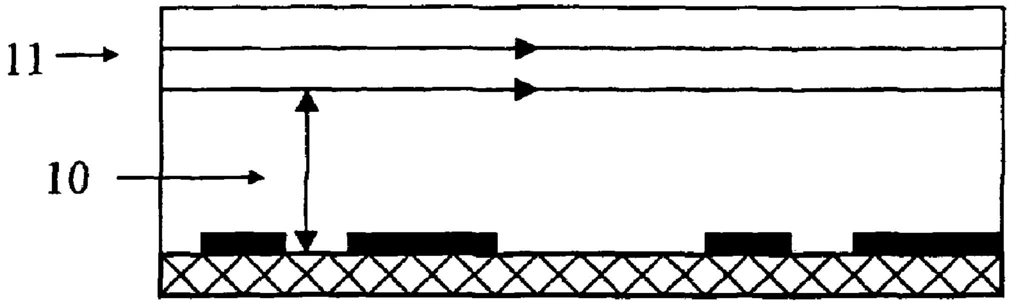
FIG. 2 is a schematic diagram showing the fluid flow profile of the device of FIGS. 1A and 1B in use.

Accordingly, it is possible for the example devices of FIGS. 1 and 5 to have a control device (not shown) associated therewith which selects the voltages applied to the electrodes, varying the amplitude and frequency thereof dependent upon the desired magnitude and direction of flow. For example, for the configuration of FIGS. 1A and 1B a voltage of greater than 2.2 Vrms produces a reverse flow. This has benefits in that flow rates and direction can be controlled electronically without the need to change the construction of the device and with a device a minimal number of components.

In order to increase the flexibility of the device (in terms of its ability to control different fluids having differing properties and to increase the control of fluid flow), certain adaptations can be made to the examples described above.

Figure 6:
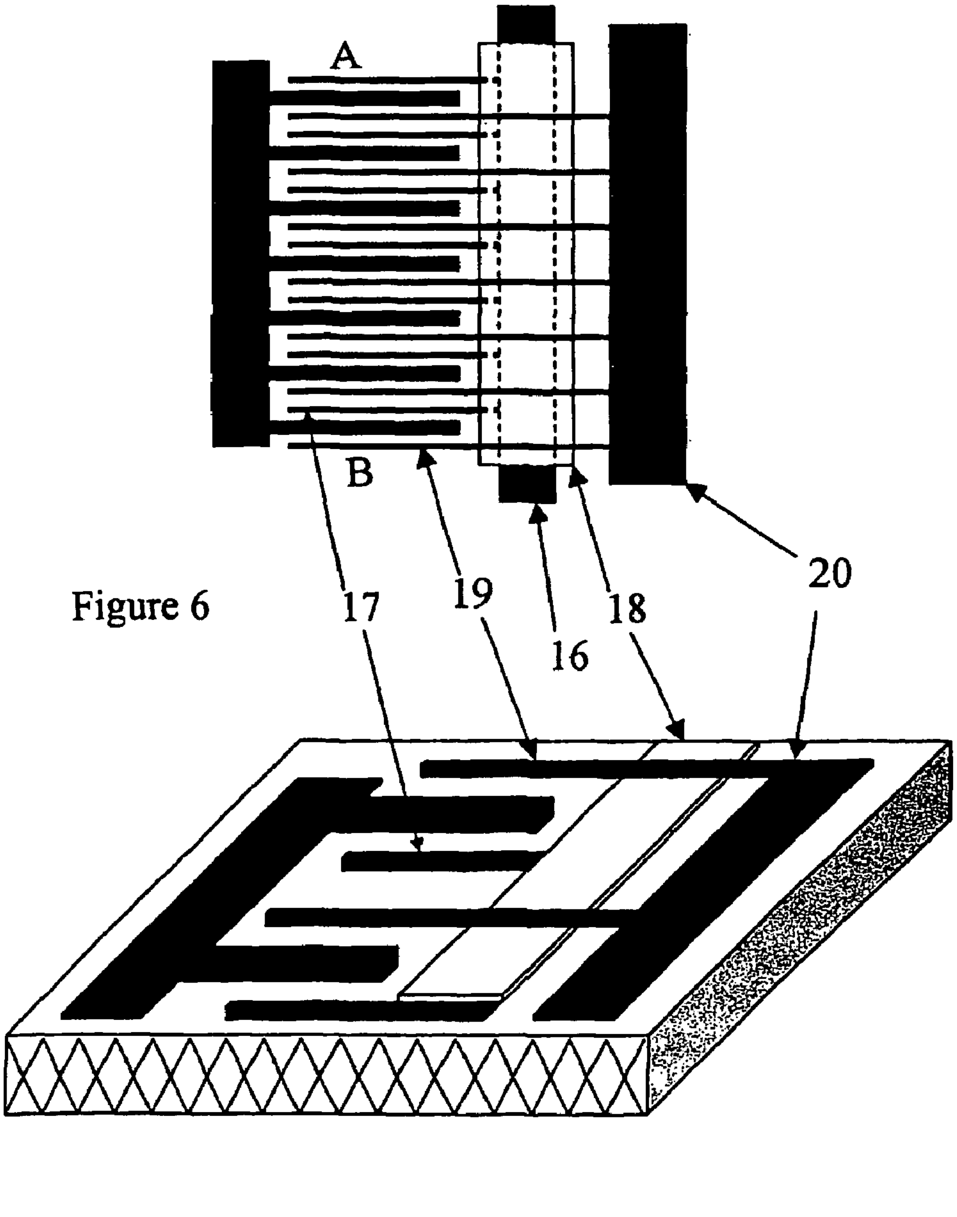
FIG. 6 shows plan and side perspective views of a further example of the invention.

FIG. 6 shows plan and perspective side views of a further example of the present invention which is arranged to use the principles of the earlier examples to provide a bi-directional fluid driving apparatus. In this example small electrodes 17 are connected to an electrically conductive plate 16 which is covered with an insulating layer 18. A second set of small electrodes 19 are connected to a second conductive plate 20, with the second set of small electrodes 19 passing over the insulator layer 18. A set of larger electrodes 6 are also provided in an interlaced fashion between pairs of narrow electrodes 17, 19. In this configuration, fluid can be driven in one of two directions dependent upon which set of small electrodes 17, 19 are activated and driven with alternating voltage applied thereto. If a first set of narrow electrodes 17 are activated then fluid movement will be in the direction from letter A to letter B if they are activated in conjunction with the larger electrodes 6. Similarly, if the second electrodes 19 are activated in combination with the larger electrodes 6, and the first set of small electrodes 17 switched off, the fluid direction will reverse.

Figure 7:
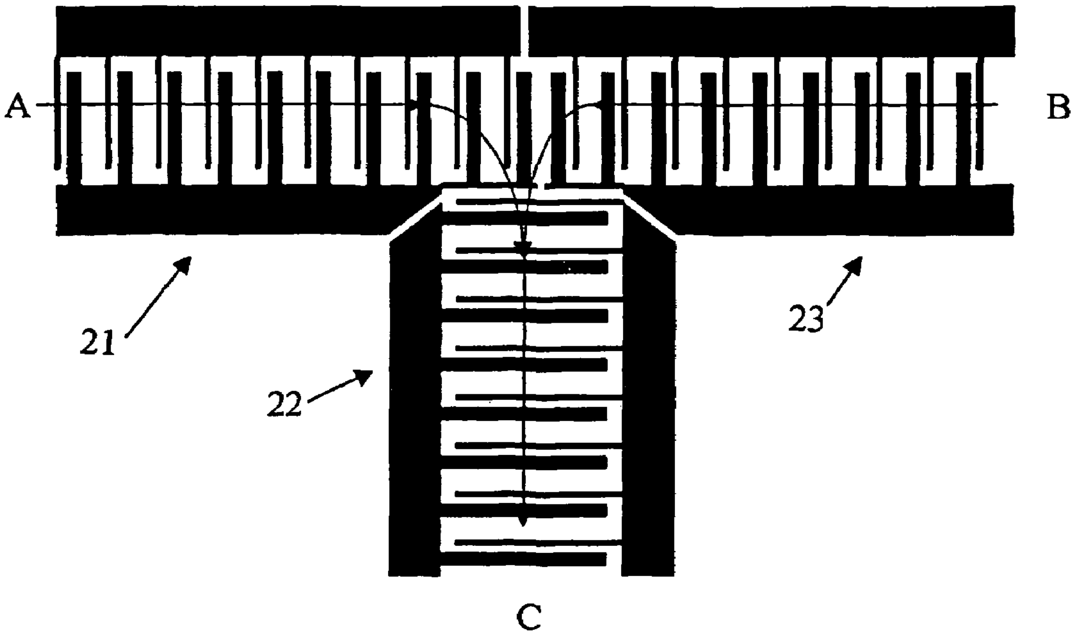
FIG. 7 is a plan view of a yet further example of the present invention.

FIG. 7 is a plan view of a further example of the present invention used to draw fluid from two sources and mix them and drive them onward in a common direction. This is done by providing arrays 21, 22, 23 of interlaced small and larger electrodes configured so that fluid can be drawn in from points A & B, mixing where the arrays 21, 23 meet and then being drawn down in the direction of point C via third array 22. By increasing the driving voltages in any one of the three arrays 21, 22, 23 it is possible to change the direction of flow so that, perhaps, fluid is drawn from points A and C and driven out to point B.

Figure 8A:
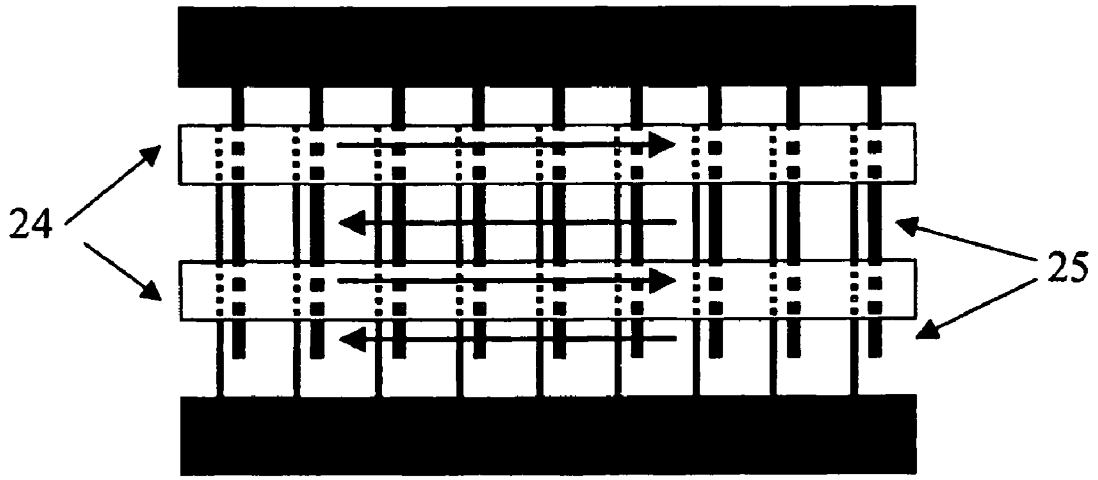
FIGS. 8A and 8B are plan and side views respectively of a yet further invention of the present invention.
Figure 8B:
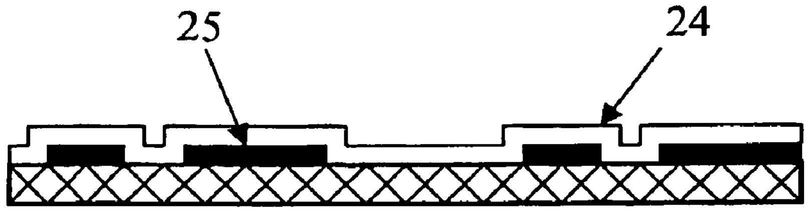

FIGS. 8A and 8B show plan and side cross-sectional views of a yet further example of the present invention. Again, interlaced small and larger electrodes 4, 6 are formed on a substrate 3. However, in this example strips of insulating material 24 are positioned over selected portions of the electrodes 4, 6. The insulator may have a thickness of 10–300 nm. This generates a configuration in which, if an appropriate driving voltage is provided to the electrodes 4, 6, the unexposed portions of the electrodes will drive the fluid in a direction opposite to that of fluid over the insulating regions 24. This is because the portions of the electrodes 4, 6 covered by the insulator regions 24 need a higher voltage to switch to drive the fluid in the direction corresponding to that being created by the exposed regions. This therefore provides a configuration in which the differing flow directions across the device generate a mixing region. Accordingly, this example could be employed at the central region of the example of FIG. 7 to provide an increased degree of mixing of fluid.

In an example device which has electrode dimensions of the type discussed with reference to the examples of FIG. 1A and 1B, and which have insulator thickness in the range discussed above, fluid flow over the insulated electrode is in a direction opposite to that of the uninsulated electrode at voltages at generally less than 1 volt Vrms. The direction of motion of fluid above the insulted electrodes changes generally at values great that 1.2 Vrms, with that above insulated electrodes changing at 1.4 Vrms.

Insulator covered electrodes offer numerous advantages. In the current design where electrodes are exposed directly to water, the maximum fluid velocity that can be achieved is limited by the maximum voltage that can be placed across the double layer before ionisation of the solution starts to occur. This maximum fluid velocity can be increased by placing an insulating layer over the surface of the electrodes. Following is a simple model that explains why this is the case.

The velocity of the fluid over the surface of an electrode is proportional to both the mobile charge in the double layer and the potential gradient or field parallel to the electrode surface, above the double layer.

These two factors are affected at a voltage just before ionisation of the solution starts by an insulating layer placed on the surface of the electrodes. If an insulating layer is introduced over the surface of the electrodes then a higher voltage can be applied to the device before ionisation of the solution occurs. However, the mobile charge in the double layer that gives rise to the pumping mechanism is still proportional to the voltage across the double layer. Thus just before ionisation of the solution the mobile charge within the double layer is the same as it was with no insulating layer.

However, the field above the double layer parallel to the electrode surface is not the same as it was without the insulating layer. This field is proportional to the potential drop from the electrode to the point above the double layer. In the case with no insulating layer this is simply given by the charge in the double layer divided by the capacitance of the double layer. If an insulating layer is present this potential drop is now across both the capacitance of the double layer and the capacitance of the insulating layer. Since these two capacitances are in series, their combined capacitance will be smaller than the capacitance of the double layer. The potential drop is given by the charge in the double layer divided by this capacitance and will thus be larger for a given charge in the double layer. Thus at the applied voltage just before ionisation of the solution, the field above the double layer parallel to the electrodes will be larger than when no insulating layer is present. The larger field will give rise to a larger fluid velocity or reversed direction of flow, dependent upon conditions such as fluid type, applied voltage or electrode dimension.

From the above model it is clear that the lower the capacitance of the double layer the greater the fluid velocity that can be achieved. However the above model makes various approximations and simplifications which will provide an upper limit to the optimal thickness. The finite size of the electrodes will reduce the maximum possible velocity, as the thickness of the insulating layer become a significant fraction of the electrode size. The required driving voltage will also increase as the thickness of the insulating layer is increased.

Theoretically it has been shown that smaller electrode sizes should provide higher velocities.

Figure 9:
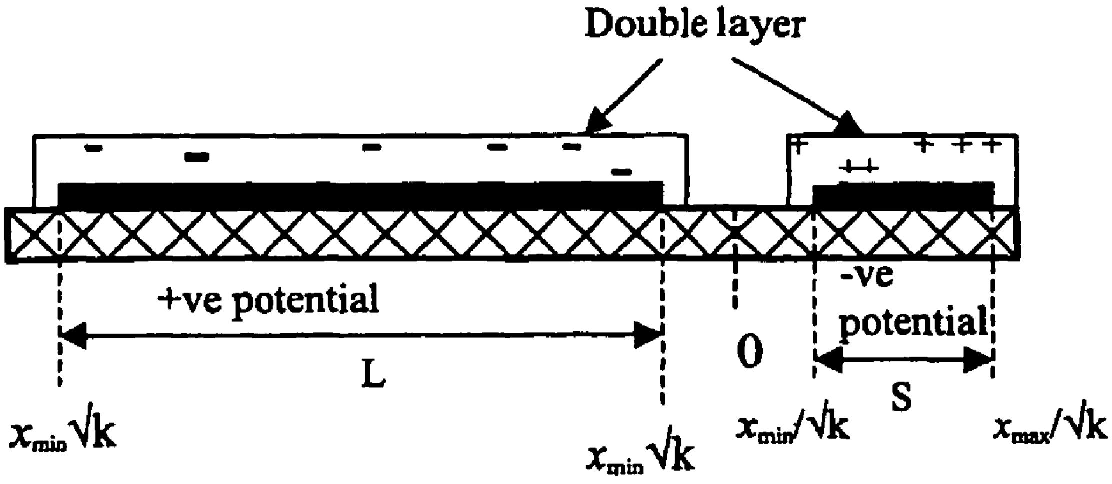
FIG. 9 is a side view of an example of the present invention showing relative electrical potentials within the example.

FIG. 9 is a schematic side view of a single adjacent narrow and broader electrode configuration on a substrate 3 showing length scales. This shows a double layer on each of the electrodes 4, 6 and the width of the electrodes S and L for the narrow and broader electrodes 4, 6 respectively. The ratio between the electrode widths is given by $K=L/S \cdot X_{min}$ and $X_{max}$ and is such that the broader electrode 6 lies between $X_{min}\sqrt{k}$ and $X_{max}\sqrt{k}$ from an origin O and the narrower electrode 4 lies between $X_{min}/\sqrt{k}$ and $X_{max}/\sqrt{k}$ from origin O.

The frequency that gives the maximum average velocity is given by $\omega_0/\sqrt{(X_{min}X_{max})}$. Hence, the maximum velocity is mainly a function of electrode size and the supplied voltage.

We have shown that smaller electrode size increases the velocity by a factor of about 2 by reducing the electrode size by the same factor. This paves a way to very narrow channels that can pump at very high velocities.

Figure 10:
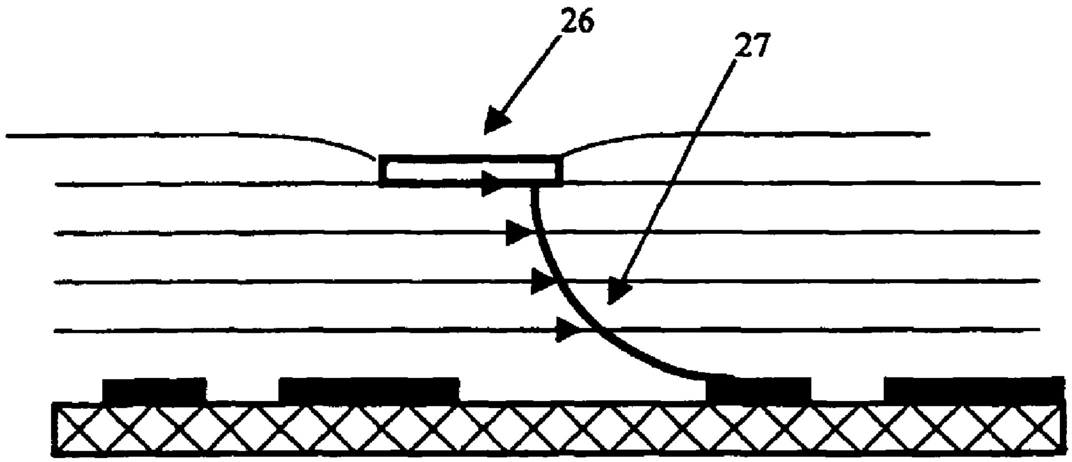
FIG. 10 is a side view of an example of the present invention being employed to move a component in a fluid.

FIG. 10 is a schematic diagram showing an object 26 being pumped in the direction of flow of the fluid over electrodes 4, 6 from any of the above examples. Feature 27 shows the flow profile of the fluid with velocity decreasing with height above the electrodes 4, 6.

The object is propelled from below through the boundary layer that will form around the object. Since in this invention the flow profile 27 is such that the velocity decreases with height above the electrodes, this means there is a decrease in pressure from where the object is floating to the electrode surface. This aids in pinning the object in its course as the pressure differences on the sides could cause it to rotate or move sideways. The object is seen to move in a straight line.

If the object is propelled to the centre of the arrangement shown in FIG. 7, it should be possible to rotate it with electrodes 21 and 23 turned on and the fluid in electrodes 22 held at some pressure. The rotation can as well be achieved with the arrangement shown in FIG. 8(*a*) where the object can be placed in such a way that it experiences the fluid flowing in two opposite direction. If when propelling devices or any objects their final orientation is crucial, then being able to rotate is highly useful to achieve the required results.

As the electrodes are capable of driving the fluid in the forward and backward direction, we have observed the objects going at velocities well above 100 μm/s in both directions.

Figure 11:
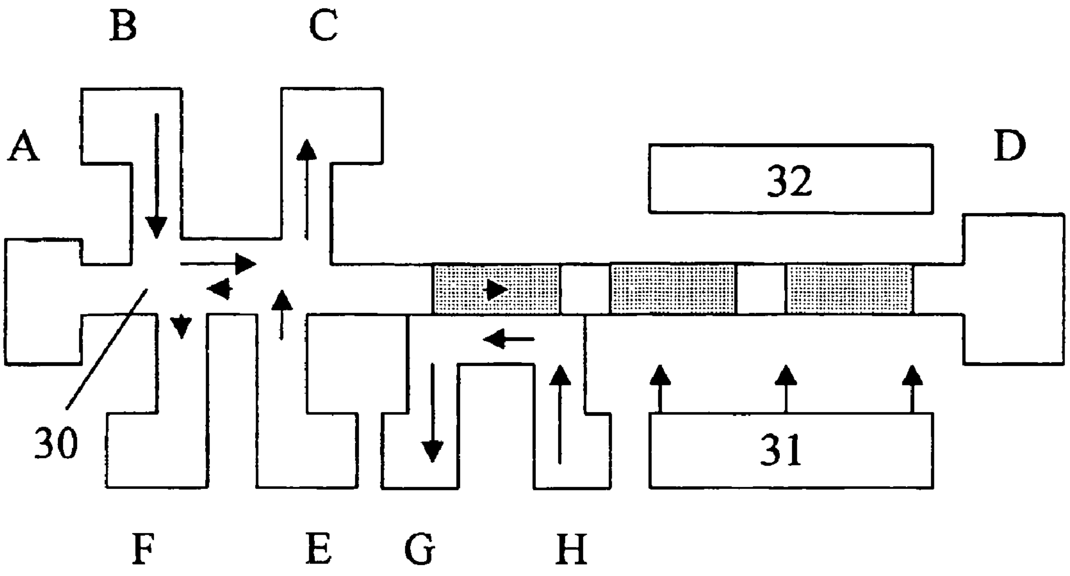
FIGS. 11 and 12 are planned schematic views of a diffusion reactant chamber employing the concepts of the present invention.
Figure 12:
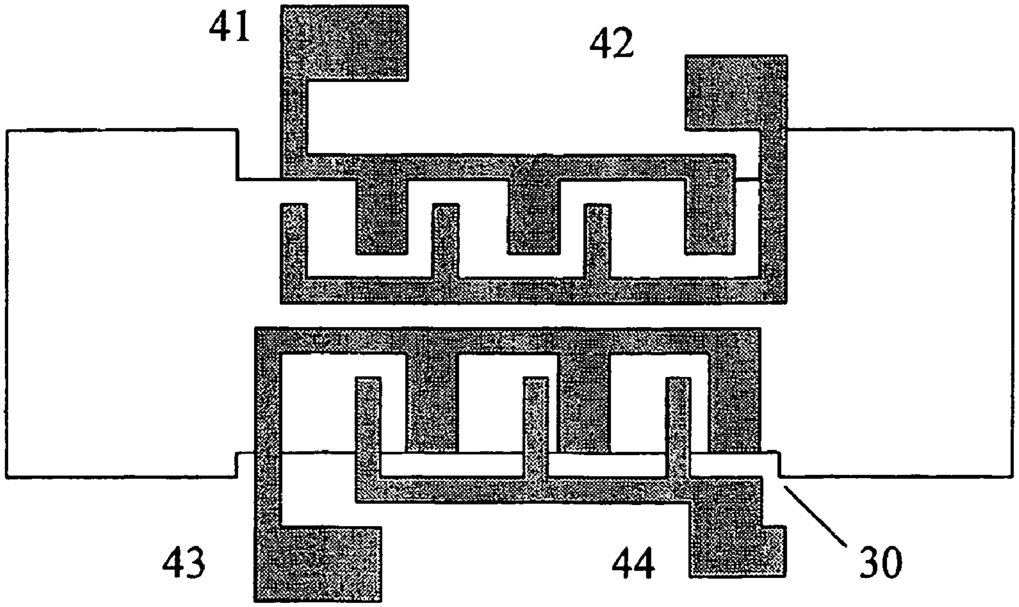

Another example of the invention, that could be used to react two different chemicals or biological substances dissolved in a fluid, is shown in FIGS. 11 and 12. This is an eight port structure fabricated on silicon dioxide which could be the top layer of a CMOS chip. The central reaction chamber 30 can take several forms, such as two sets electrodes arranged to pump fluid at different velocities, but laterally spaced by a few microns with the flow in opposite directions either side of the gap. One reactant containing small marker molecules which bind to, for example, a protein to be identified, is pumped in solution from port B to C at quite a high velocity, while proteins are pumped from ports F to E more slowly. After some time (completion of the reaction) the reactants are pumped from A to C, with the flow switched off in the arms B, C, E, F. This process is then be repeated to produce short regions of reactants in the arm D separated by regions without reactants. The reactant mixture is then moved to a second chamber were clean fluid is pumped past the mixture electrodes G and H. The smaller fluorescent molecules that had not bound to the larger proteins diffuse into this flowing region and are taken away. The geometry of these reaction chambers is such that the smaller fluorescent molecules have time to diffuse across the reaction chamber 30, but only a small percentage of the larger molecules diffuse from one side to the other. This technique relies on the large target molecule diffusing slower than the smaller fluorescent marker.

After some time the resulting reactants are observed to see that the proteins had markers attached in the sections where the flows had been brought together. The central region 30 has two sets of electrodes that can pump fluids at different velocities in the same or opposite directions, by control of their drive voltages, in the manner discussed above. The smaller molecules can then diffuse across from one flow region to the next, while the larger proteins do not have time to diffuse in the opposite is direction. As a result it can ensure that there are enough of the smaller markers supplied to fully react with the larger molecules.

It could be that the smaller molecules fluoresce and bind to the larger protein molecules (that could be proteins) making them fluoresce under UV light. We can then observe if the proteins fluoresce.

If a user were looking to identify smaller molecules or particles such as a virus, then the virus can be bound with a larger molecule or colloidal particle before exposing the target substance to the fluorescent markers.

Rather than have an observer identify the fluorescence as is commonly employed now, UV light source 31 illuminates the resulting products and the current in a photo-diode 32 observed under the reactants on the same chip. The photodiode 23 has a filter 33 that only lets light through at the wavelength of the fluorescent molecules. The diode 32 may, for example, be a silicon diode defined using semiconductor processing directly under the electrodes that do the pumping. The electrodes can also be defined using silicon chip technology and could be made from TiN (Titanium nitride), or Al or Ti,or Tu. The filter 33 is made using layers of thin semitransparent metal (TiN) with a transparent insulator (silicon nitride or silicon dioxide) in between in the manner of a Fabry Perot interferometer.

The current generated in the diode 32 depends on the amount of fluorescent markers which depends on the number of larger molecules. The circuitry in the chip under the electrodes is designed to detect this current and give an electrical signal out of the chip to indicate the amount of target molecules present.

The above structure can have pumping electrodes at the top and the bottom separated by a 100 micron spacer. The channels can be around 1 mm wide. These dimensions can be smaller but larger values to keep the costs of fabrication down.

FIG. 12 is a schematic of the reaction chamber 30 where different fluids can be pumped in the same or different directions past each other. Electrodes 41 and 42 are used to move fluid from left to right in the top part of the diagram, while electrodes 43 and 44 are used to hold the bottom fluid constant or move the fluid from the right to the left. After the reaction is finished the drawing voltages and frequencies are adjusted to move the fluid off to the right at the same velocity in the top half and bottom half of the diagram. Other electrodes to the left or right are activated at this stage to move the reactant mixture to the next stage.

Because the invention can not be used to introduce fluid into a region containing a gas, we must prepare the chip by immersing it in an ionic solution that will not react with the reagents. For many examples a slightly salty water solution is acceptable. This immersion procedure is performed in an ultrasonic bath to ensure that no bubbles are left behind. The top of the device then has a removable flexible film stuck over the holes to keep the chip clean until it is needed. To prevent the build up of back pressure on the fluids being pumped it must be ensured that the volume of the reservoirs above the holes is large in comparison to the volume of the reaction chambers and channels (tens of nanoleters).

Figure 13:
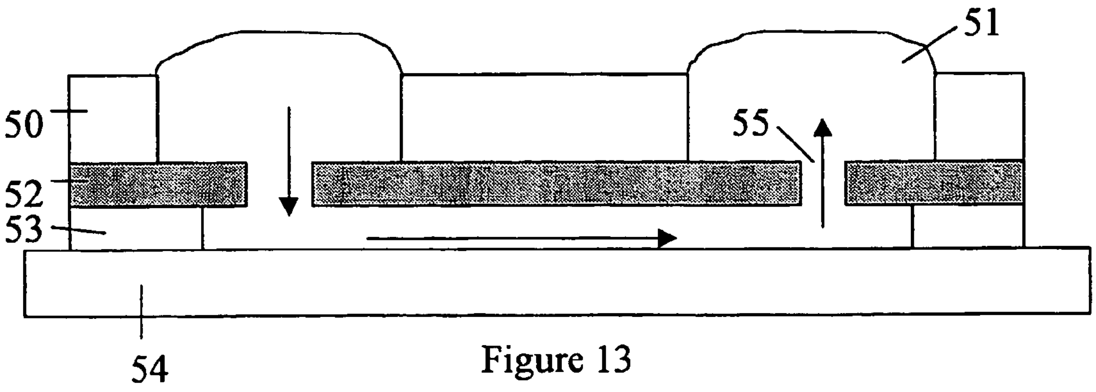
FIGS. 13 and 14 are side and perspective views of an example of the present invention.

FIG. 13 is a side view of the device. The top layer 50 is plastics material and has holes 51 etched into it to provide reservoirs where the test liquids are placed. The layer 52 under this is glass and it has holes of, for example, 0.3 microns drilled through it to allow the fluid to drop down into the channels below. The glass layer has patterned electrodes on the bottom which are used to drive the top layer of the fluid in the channels below. Under this glass layer there is a (for example 100 micron thick) spacer layer 53 which has for example 200 micron wide channels cut out of it. Under this are the patterned electrodes which provide the pumping from the bottom. Bond pads to connect to the bottom electrode are positioned at each end, while bond pads to drive the top electrode are positioned on the underside of the glass 52 where it overhangs the sides of the bottom chip 54.

Figure 14:
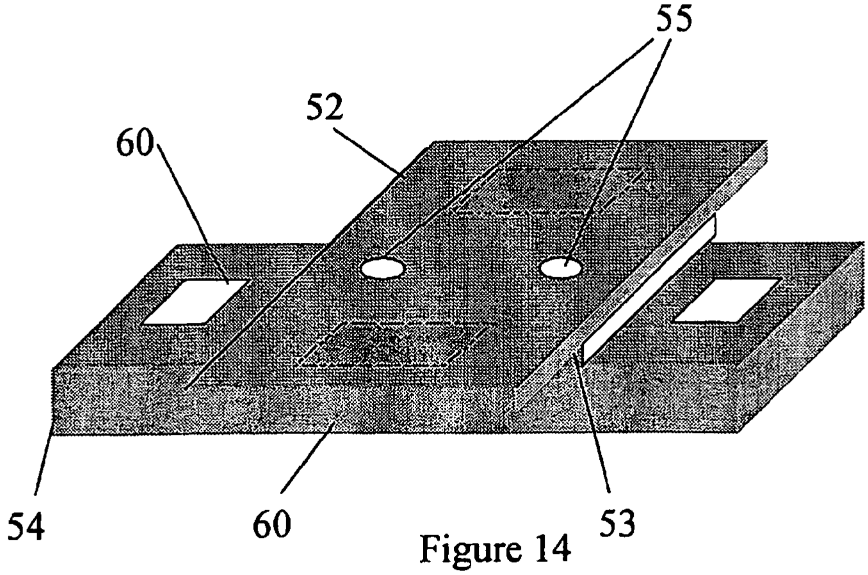

A more integrated solution (shown in FIG. 14) uses chip wafer bonding techniques to join the top electrodes to the bottom chip. Metal vias 60 provide electrical contact from the bottom chip that contains the electronics for driving both the top and bottom electrodes.

The invention can provide mixing on a microscopic scale. This is very hard to do with prior art devices, but the invention can be employed can do this on very small length scales of a few tens of microns. This allow the speeding up of many reactions which are at the moment diffusion limited.

Figure 15:
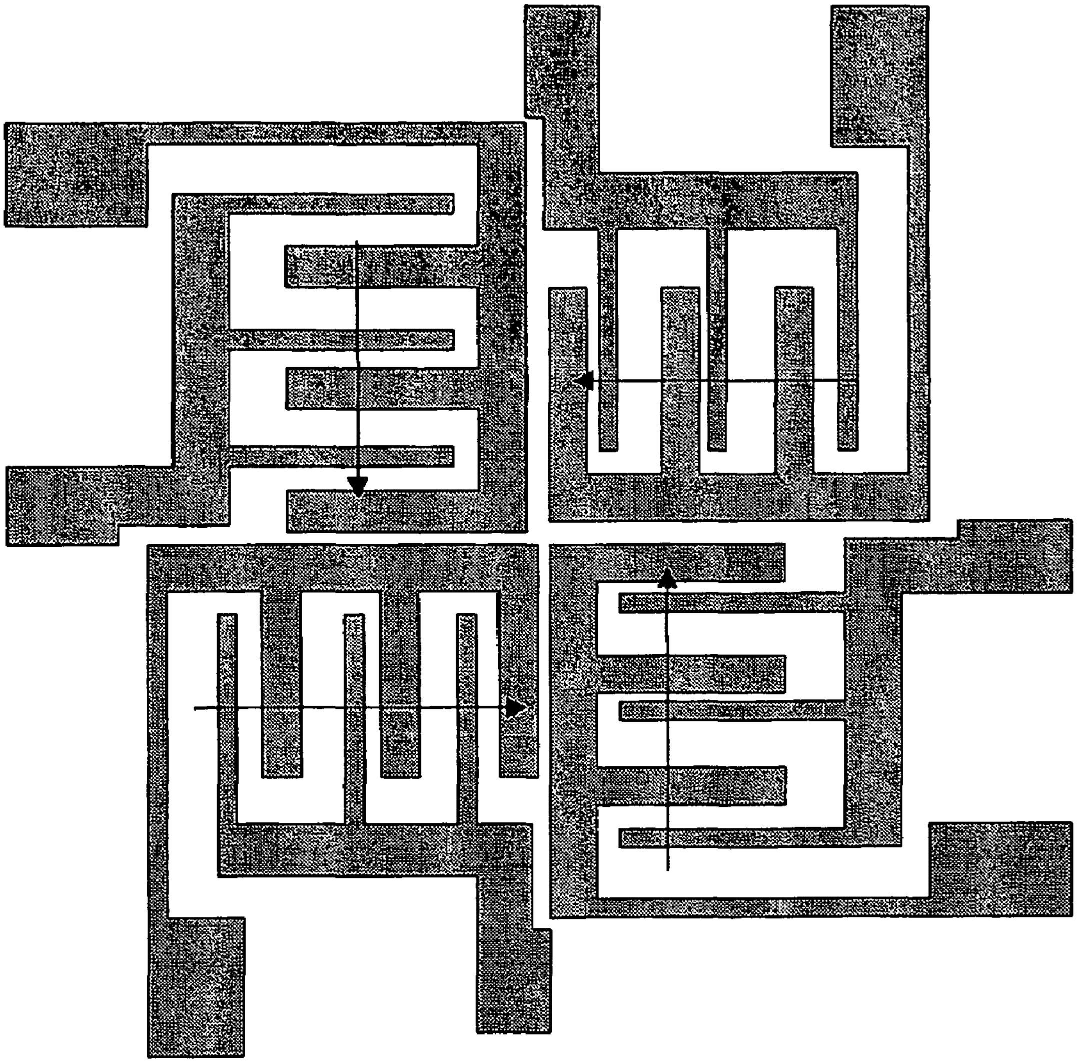
FIG. 15 is a plan view of a mixing chamber employing the concepts of the present invention.

One technique for mixing uses four pairs of electrodes arranged to pump liquid in four different directions at right angles to each other. Such an arrangement is shown in FIG. 15 electrodes in the shapes shown pump fluids round in a circle for mixing. Other electrodes can be provided which are arranged to pump fluids into this region and then back out after mixing.

The electrodes are marked in grey and the arrows show the fluid flow over each region if they are all operated with the same AC voltage applied across pairs of electrodes.

The invention claimed is:

1. An apparatus for driving small volumes of fluid, the apparatus comprising:

a substrate;

a first array of electrically conductive electrodes formed on the substrate; and a second array of electrically conductive electrodes formed on the substrate, the first and second array being interlaced and being arranged such that each of the electrodes in the second array has a width in a fluid driving direction which is greater than that of each of the electrodes in the first array and such that the first and second set electrodes are positioned so that each of the electrodes of the first set is not at a position equidistant from adjacent electrodes of the second set, wherein both of the arrays of electrodes have widths in the fluid flow direction and thickness selected such that, in use, by varying the peak value of an alternating drive voltage applied thereto the direction of flow of a fluid adjacent to the arrays of electrodes can be controlled.

2. The apparatus of claim 1, further comprising means for providing a variable alternating voltage to the first and second array of electrodes.

3. The apparatus of claim 1, wherein an insulator is provided over at least a portion of one or both of the electrode arrays.

4. The apparatus of claim 1 arranged to drive fluid passing thereover in two opposite directions in order to provide a mixing effect.

5. The apparatus of claim 1 further comprising a third set of electrodes having a width equal to that of the first set, interlaced with the second set of electrodes and separated from the first set by an insulator.

6. An apparatus according to claim 1, in which the electrodes and substrate are formed as part of a CMOS process.

7. An apparatus according to claim 1 arranged to be employed in a biochemical analysis process or drug manufacture process.

8. A device for moving fluid by plug flow comprising two apparatus according to claim 1 facing one another and defining a cavity therebetween.

9. A device for drawing fluids from two sources, mixing them and pumping them, the device comprising a first apparatus, a second apparatus and a third apparatus according to claim 1; wherein the second apparatus electrodes are arranged to be a mirror image of those of the first apparatus; and the third apparatus is positioned at the meeting point of the first and second apparatus.

10. A diffusion reactant monitoring device comprising an apparatus according to claim 1 which at least partially defines a diffusion reactant chamber and further comprising at least two supply ports and an outlet including an illuminating light source and a filtered optoelectrical detector.

11. A method for driving small volumes of fluid, the method comprising the steps of:

providing a substrate;

providing a first array of electrically conductive electrodes formed on the substrate and a second array of electrically conductive electrodes formed on the substrate, the first and second array being interlaced and being arranged such that each of the electrodes in the second array has a width in a fluid driving direction which is greater than that of each of the electrodes in the first array and such that the first and second set electrodes are positioned so that each of the electrodes of the first set is not at a position equidistant from adjacent electrodes of the second set; and by varying the peak value of an alternating drive voltage applied thereto, controlling the direction of flow of a fluid adjacent to the arrays.

12. The method of claim 11, wherein the fluid is driven in two opposite directions in order to provide a mixing effect.

13. A method of monitoring a diffusion reactant, comprising the method of claim 12, and further comprising the step of providing fluids from at least two supply ports; and providing mixed fluid to an outlet including an illuminating light source and a filtered opto-electrical detector.

* * * * *